May 7, 1940.　　　　L. JAENICHEN　　　　2,199,704
MEAT GRINDER
Filed Dec. 17, 1937
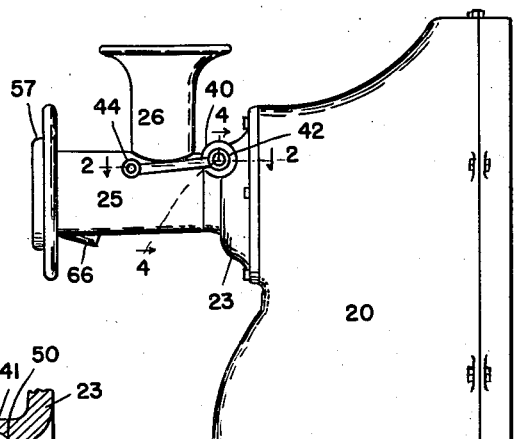
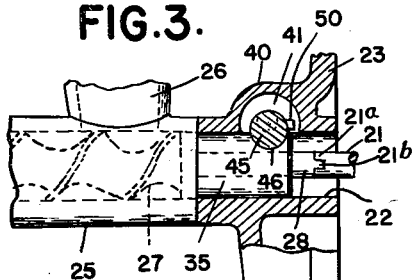
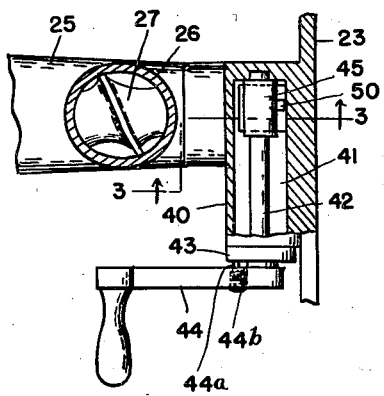
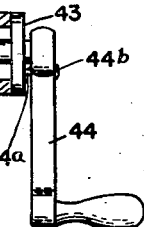
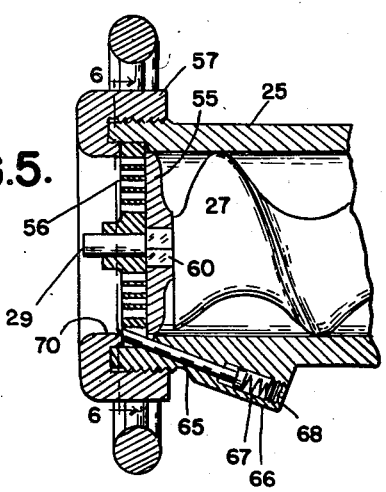
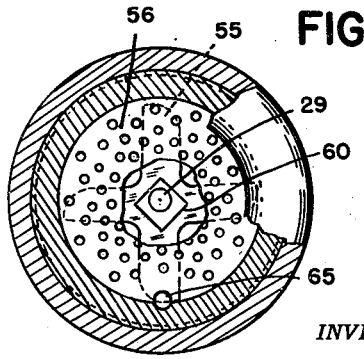
INVENTOR
LOUIS JAENICHEN
BY
ATTORNEYS Patented May 7, 1940

2,199,704

UNITED STATES PATENT OFFICE 2,199,704

MEAT GRINDER

Louis Jaenichen, Springfield Township, Oakland County, Mich., assignor to The Standard Computing Scale Company, Detroit, Mich., a corporation of Michigan Application December 17, 1937, Serial No. 180,371

6 Claims. (Cl. 287—119)

The present invention relates to meat grinders or choppers and more particularly to grinders or choppers utilizing power units for their operation.

In such power operated choppers it is usual to so arrange the feed bowl and chopper proper as to be detachable from the power unit for the purpose of cleaning or for temporary storage in a refrigerator, and several means have been devised for securing the bowl to the power unit. With the known devices, however, the bowl is sometimes difficult to detach after unfastening and with some of the devices the attachment is not very easily accomplished.

Among the objects of the invention, therefore, is attaching means for devices of the sort which may be easily and quickly operated to attach the bowl securely to the power unit and may also be easily and quickly operated to detach the two.

Another object is an attaching means which when operated to detach the bowl acts positively to give the bowl an initial movement toward separation.

A further object of the present invention is to improve the efficiency in the cutting action of such devices by the provision of means insuring the close contact between the knife and plate.

Still another object is means for mounting the knife in such fashion as to cause more of a slicing action upon the meat slicers as they are forced through the plate.

Other objects and advantages will be apparent from the following description wherein reference is made to the accompanying drawing illustrating preferred embodiment of my invention, and wherein similar reference numerals designate similar parts throughout the several views.

In the drawing:

Figure 1 is a side elevation of a grinder embodying the present invention.

Figure 2 is a section taken on line 2—2 of Figure 1.

Figure 3 is a section taken on the line 3—3 of Figure 2.

Figure 4 is a section taken on line 4—4 of Figure 1.

Figure 5 is a vertical central section of the cutter end of the grinder.

Figure 6 is a section taken on line 6—6 of Figure 5 with a part broken away and a part of the nut in elevation.

As indicated, the chopper comprises a power unit 20 consisting of a housing containing a motor, and reduction gearing from which a power take off shaft 21 projects into a suitable sleeve portion 22 of a cover plate 23, the end of shaft 21 being notched as at 21a to receive a tang 21b on the feed screw shaft of the chopper.

The chopper comprises the usual slightly tapering body portion 25 having a hopper 26 and containing a feed screw 27, the latter having a reduced shaft portion 28 carrying the tang 21b and also reduced at its other end to form a shaft portion 29.

As shown best in Figures 3 and 4, the end of body 25 adjacent the hopper 26 is reduced as at 35 to form a slightly tapering portion serving as a bearing for shaft 28 and fitting snugly into sleeve 22 in plate 23, the parts being of such proportions that when they are together, the tang 21b fits into the notched end 21a of power shaft 21.

The fastening means for the parts just described is shown in Figures 1 to 4 to comprise a boss 40 on plate 23 bored longitudinally as at 41, so that the interior is open to sleeve 22 as shown in Figure 3, and is also provided at the inner end of the bore with bearing means for a shaft 42, while the outer end of the bore is closed by a suitable cap or plug 43 furnishing a bearing for the other end of shaft 42, the latter extending through the cap or plug and carrying a crank handle 44.

Fixed upon shaft 42 is a cam or eccentric piece 45 of sufficient size to project into the path of portion 35 of the body as the latter is moved into or out of sleeve 22 and so arranged that, by turning the shaft 42, the piece 45 may be moved out of said path. And to cooperate with the piece 45, a cylindrical notch 46 is provided in part 35 near its end.

Also fixed to shaft 42 about midway of the length of the eccentric 45 is a projecting finger 50 so located as to strike the end of the bowl portion 35 (Fig. 3) when the shaft 42 is rotated to lift the eccentric 45 out of the notch 46, and to have a short free movement before contacting said end.

It will be noted that the eccentric will be so located with respect to the several parts that when the handle 44 is in the position shown in Figure 1, the point of maximum eccentricity of the eccentric will be close to the bottom of the notch 46. If so arranged as to pass this position, the weight of the handle will be sufficient to maintain the parts locked under all conditions. It is preferred however on account of possible wear to so arrange the eccentric that the point of maximum eccentricity will not quite reach the bottom of the notch 46, and to provide the handle 44 with a spring-pressed detent 44a, held in place by a plug 44b, and cooperating with a suitable notch in the face of plug 43, to add a small resistance to the weight of the handle 44 so as to insure locking even when the eccentric is in position to receive a slight turning impulse due to end thrust upon the bowl.

The axis of feed screw 27 and shaft portion 29, is as shown in Figure 6, slightly eccentric. This arrangement, by moving the knife edges out of their normally nearly radial relation causes more of a slicing action and thereby improves the cutting.

Further, in the conventional chopper, the plate 56 is fixed against rotation by means of a fixed pin which prevents the tightening of the nut down upon the plate if the latter becomes thin from sharpening or if relatively thin when new.

In the present construction the fixed pin is eliminated and a retractible pin 65 is used, this pin 65 recedes into a suitable recess provided in a boss 66 upon the body 25 being biased outwardly by a suitable spring 67 held in place against the pin by a suitable screw plug 68.

When the pin 65 is thrust outward it will protrude above the edge of the body and lies in a notch in plate 56 thereby preventing the latter from rotation. And as the nut 57 is screwed in place, the flange 70 strikes the end of the pin and pushes it inward until the flange 70 lies against the plate 56 holding the latter tightly against the knife 55.

What I claim is:

1. A coupling comprising a sleeve, a male member fitting therein, and means for fixing the two parts together comprising a rotatable member in said sleeve provided with a cylindrical eccentric portion rotatable into and out of the path of the male member moving into or out of said sleeve, said male member being provided with a transverse notch closely fitting said eccentric portion when the latter is moved into said path and the parts are in coupled position, said eccentric portion and notch being so located on their respective members that in locking position the point of maximum eccentricity of said portion is at approximately the deepest part of said notch.

2. A coupling comprising a female member and a male member adapted to fit therein and provided with a rounded transverse notch near its inner end, said sleeve having a recess opposite said notch when the parts are in coupled relation, a rotatable shaft traversing said recess and having fixed thereon a cylindrical eccentric member adapted to fit into said notch in one position and be substantially clear of said sleeve in another position, means for rotating said shaft, and means carried by said shaft for engaging a portion of said male member whereby, when said male member is inserted, said shaft will be rotated to bring said eccentric into said notch and when said shaft is voluntarily rotated, the male member is moved from coupled position.

3. A coupling according to claim 2 in which the eccentric member is so arranged on said shaft that the weight of the rotating means tends to rotate said shaft toward locking position.

4. A coupling according to claim 2 in which the eccentric member is so arranged on said shaft that in locked position its point of maximum eccentricity is close to the center point of said notch.

5. A coupling according to claim 2 in which the eccentric member is so arranged on said shaft that in locked position its point of maximum eccentricity is beyond the center point of said notch.

6. A coupling according to claim 1 in which the rotatable member is provided with a projection adapted to strike the end of the male member and thrust the latter from the sleeve.

LOUIS JAENICHEN.